(12) United States Patent
Tang (10) Patent No.: US 11,310,019 B2
(45) Date of Patent: Apr. 19, 2022

(54) METHOD AND DEVICE FOR TRANSMITTING UPLINK DEMODULATION REFERENCE SIGNAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 133 days.

(21) Appl. No.: 16/496,693

(22) PCT Filed: Mar. 23, 2017

(86) PCT No.: PCT/CN2017/077890
§ 371 (c)(1),
(2) Date: Sep. 23, 2019

(87) PCT Pub. No.: WO2018/170842
PCT Pub. Date: Sep. 27, 2018

(65) Prior Publication Data
US 2020/0252191 A1 Aug. 6, 2020

(51) Int. Cl.
*H04L 5/10* (2006.01)
*H04J 13/00* (2011.01)
(Continued)

(52) U.S. Cl.
CPC ............ *H04L 5/10* (2013.01); *H04J 13/0062* (2013.01); *H04L 5/0051* (2013.01);
(Continued)

(58) Field of Classification Search
CPC ..... H04L 5/10; H04L 5/0051; H04L 27/2607; H04L 27/2666; H04L 5/0007;
(Continued)

(56) References Cited

U.S. PATENT DOCUMENTS

2012/0051319 A1* 3/2012 Kwon ............... H04W 72/0406
370/329
2013/0114547 A1* 5/2013 Li .......................... H04L 5/0051
370/329
(Continued)

FOREIGN PATENT DOCUMENTS

CN 102082595 A 6/2011
CN 102957471 A 3/2013
(Continued)

OTHER PUBLICATIONS

European Patent Office, Search Report for Appl. No. EP17902249.6, dated Feb. 17, 2020.
(Continued)

*Primary Examiner* — Shailendra Kumar
(74) *Attorney, Agent, or Firm* — Hodgson Russ LLP (57) ABSTRACT

A method for transmitting uplink demodulation reference signal (DMRS) includes: receiving, by a terminal device, first DMRS configuration information sent by a network device, the first DMRS configuration information indicating a type of a DMRS sequence; receiving, by the terminal device, second DMRS configuration information sent by the network device, the second DMRS configuration information indicating at least one configuration parameter of: an antenna port configuration of DMRS, a physical resource configuration of DMRS, or a sequence configuration of DMRS; determining, by the terminal device, a configuration parameter indicated by the second DMRS configuration information according to the first DMRS configuration information; determining, by the terminal device, a transmission parameter of DMRS according to the configuration parameter indicated by the second DMRS configuration information; and transmitting, by the terminal device,
(Continued)

DMRS to the network device according to the transmission parameter.

14 Claims, 4 Drawing Sheets

(51) Int. Cl.
   *H04L 5/00* (2006.01)
   *H04L 27/26* (2006.01)
   *H04W 72/04* (2009.01)
(52) U.S. Cl.
   CPC ...... *H04L 27/2607* (2013.01); *H04L 27/2666* (2013.01); *H04W 72/042* (2013.01); *H04W 72/0413* (2013.01)
(58) Field of Classification Search
   CPC .. H04L 5/0094; H04L 5/0048; H04J 13/0062; H04W 72/0413; H04W 72/042
   See application file for complete search history.

(56) References Cited

U.S. PATENT DOCUMENTS

| | | | | |
|---|---|---|---|---|
| 2014/0293881 | A1* | 10/2014 | Khoshnevis | .......... H04L 5/0046 370/329 |
| 2016/0087774 | A1 | 3/2016 | Guo et al. | |
| 2016/0105882 | A1 | 4/2016 | Park et al. | |
| 2018/0026684 | A1* | 1/2018 | Wei | ....................... H04L 5/0007 370/329 |

FOREIGN PATENT DOCUMENTS

| | | | | |
|---|---|---|---|---|
| CN | 104125186 | | 10/2014 | |
| CN | 106160990 | A | 11/2016 | |
| CN | 106454694 | | 2/2017 | |
| CN | 106470087 | | 3/2017 | |
| CN | 108024342 | A * | 5/2018 | ............. H04L 27/26 |
| JP | 2015517759 | | 6/2015 | |
| JP | 2016518035 | | 6/2016 | |
| KR | 20130126347 | | 11/2013 | |
| RU | 2518909 | | 6/2014 | |
| WO | 2012147273 | | 11/2012 | |
| WO | 2016127939 | | 8/2016 | |

OTHER PUBLICATIONS

LG Electronics, "UL DMRS Design," 3GPP TSG RAN WG1 Meeting #88, R1-1702462, Feb. 2017, 3 pages.
WIPO, ISR for PCT/CN2017/077890, Dec. 28, 2017.
Huawei et al., "Evaluation results of DMRS design for DL data channel," 3GPP TSG RAN WG1 Meeting #88, R1-1701693, Feb. 2017, 14 pages.
Zte et al., "WF on DL DMRS design for data channel," 3GPP TSG RAN WG1 Meeting #88, R1-1703883, Feb. 2017, 3 pages.
FSIP, Office Action for RU Application No. 2019132945-07, dated May 27, 2020.
INAPI, Chile, First Office Action for CL 201902689, dated Nov. 25, 2020.
IPO Canada, First Office Action for CA 3057535, dated Nov. 6, 2020.
SIPO, First Office Action for CN 201911320481.3, dated Nov. 3, 2020.
EPO, Extended European Search Report for EP 21165771.3, dated Apr. 19, 2021.
IP India, First Office Action for IN 201917042258, dated Feb. 8, 2021.
"3rd Generation Partnership Project; Technical Specification Group Radio Access Network; Evolved Universal Terrestrial Radio Access (E-UTRA); Physical channels and modulation (Release 14)," 3GPP TS 36.211, Mar. 2017, v14.2.0, 195 pages.
LG Electronics, "DMRS Design Principle," 3GPP TSG RAN WG1 Meeting #87, R1-1611812, Nov. 2016, 6 pages.
JPO, Office Action for JP Application No. 2019-552539, dated May 11, 2021.
KIPO, Office Action for KR Application No. 10-2019-7029355, dated Jun. 21, 2021.
JPO, Decision of Refusal for JP Application No. 2019-552539, dated Dec. 24, 2021.
IPA, Office Action for AU Application No. 2017404901, dated Feb. 11, 2022.

* cited by examiner

FIG. 6

METHOD AND DEVICE FOR TRANSMITTING UPLINK DEMODULATION REFERENCE SIGNAL

CROSS-REFERENCE TO RELATED APPLICATION

This application is a U.S. national phase application of International Application No. PCT/CN2017/077890, filed Mar. 23, 2017, the entire disclosure of which is incorporated herein by reference.

TECHNICAL FIELD

The present application relates to the field of communications, and more particularly, to a method and a device for transmitting uplink demodulation reference signal.

BACKGROUND

In future communication systems (e.g., 5th Generation, 5G), multiple waveforms may be used for uplink transmission, for example, Discrete Fourier Transform Spread Orthogonal Frequency Division Multiplexing (DFT-S-OFDM), Cyclic Prefix (CP)-OFDM, and the like. Same resource may be multiplexed between a terminal device using the CP-OFDM waveform and a terminal device using the same waveform, or between the terminal device using the CP-OFDM waveform and a terminal device using the DFT-S-OFDM waveform. If sequence-based orthogonal transmission is expected to be supported in the above two multiplexing scenarios, the terminal device using the CP-OFDM waveform needs to support various sequence types at the same time, while different sequence types corresponding to different configurations.

However, the method for transmitting uplink demodulation reference signal in the related art cannot satisfy the requirement that the terminal device simultaneously supports various Demodulation Reference Signal (DMRS) sequence types. Therefore, it is required to provide a method for transmitting uplink demodulation reference signal, so that the terminal device can simultaneously support multiple DMRS sequence types, and can support resource multiplexing between terminal devices using different uplink waveforms as well as between terminal devices using the same uplink waveform.

SUMMARY

The present application provides a method and a device for transmitting uplink demodulation reference signal, which can enable a terminal device to simultaneously support multiple DMRS sequence types, and support resource multiplexing between terminal devices using different uplink waveforms as well as between terminal devices using the same uplink waveform.

According to a first aspect, there is provided a method for transmitting uplink demodulation reference signal, including: receiving, by a terminal device, first demodulation reference signal (DMRS) configuration information sent by a network device, the first DMRS configuration information indicating a type of a DMRS sequence; receiving, by the terminal device, second DMRS configuration information sent by the network device, the second DMRS configuration information indicating at least one of an antenna port configuration of DMRS, a physical resource configuration of DMRS, and a sequence configuration of DMRS; determining, by the terminal device, a configuration parameter indicated by the second DMRS configuration information according to the first DMRS configuration information; determining, by the terminal device, a transmission parameter of DMRS according to the configuration parameter indicated by the second DMRS configuration information; and transmitting, by the terminal device, DMRS to the network device according to the transmission parameter.

According to the method for transmitting uplink demodulation reference signal provided by the application, the terminal device determines a type of DMRS sequence according to the first DMRS configuration information, which indicates the type of DMRS sequence, determines a configuration parameter indicated by the second DMRS configuration information according to the type of DMRS sequence, determines a transmission parameter of DMRS according to the determined configuration parameter and, then, performs transmission of the DMRS according to the transmission parameter of DMRS. In this way, the terminal device is able to determine the transmission parameter for each type of DMRS sequence according to the first DMRS configuration information and the second DMRS configuration information and, thus, may simultaneously support multiple types of DMRS sequence, and support resource multiplexing between terminal devices using different uplink waveforms as well as between terminal devices using the same uplink waveform. So the resource utilization may be improved.

In combination with the first aspect, as an implementation manner of the first aspect, the transmission parameter of DMRS includes at least one of an antenna port occupied by the DMRS, physical resource occupied by the DMRS, a DMRS sequence, and a transmission power of the DMRS.

In combination with the first aspect, as another implementation manner of the first aspect, the first DMRS configuration information is indicative of the DMRS sequence being one of a pseudo-random (PN) sequence and a ZC sequence.

In combination with the first aspect, as another implementation manner of the first aspect, the antenna port configuration of DMRS includes an antenna port occupied by the DMRS or a number of antenna ports occupied by the DMRS.

In combination with the first aspect, as another implementation manner of the first aspect, the determining, by the terminal device, a transmission parameter of DMRS according to the configuration parameter indicated by the second DMRS configuration information includes:

determining by the terminal device, when the terminal device determines the second DMRS configuration information indicates the antenna port configuration of DMRS, an antenna port occupied by the DMRS according to the antenna port configuration of DMRS; and/or, determining by the terminal device, when the terminal device determines the second DMRS configuration information indicates the antenna port configuration of DMRS, physical resource occupied by the DMRS according the antenna port configuration of DMRS; and/or, determining by the terminal device, when the terminal device determines the second DMRS configuration information indicates the antenna port configuration of DMRS, a transmission power of the DMRS according to the antenna port configuration of DMRS; and/or, determining by the terminal device, when the terminal device determines the second DMRS configuration information indicates the antenna port configuration of DMRS, a sequence cyclic shift and/or an orthogonal cover code (OCC) used by the DMRS according to the antenna port configuration of DMRS, and generating, by the terminal device, the DMRS sequence according to the sequence cyclic shift and/or the OCC used by the DMRS.

In combination with the first aspect, as another implementation manner of the first aspect, the physical resource configuration of DMRS includes at least one of a number of orthogonal frequency division multiplexing (OFDM) symbols occupied by the DMRS, a subcarrier occupied by the DMRS, and a transmission pattern of the DMRS.

In combination with the first aspect, as another implementation manner of the first aspect, the determining, by the terminal device, a transmission parameter of DMRS according to the configuration parameter indicated by the second DMRS configuration information includes:

determining by the terminal device, when the terminal device determines the second DMRS configuration information indicates the physical resource configuration of DMRS, physical resource occupied by the DMRS according to the physical resource configuration of DMRS; and/or determining by the terminal device, when the terminal device determines the second DMRS configuration information indicates the physical resource configuration of DMRS, the DMRS sequence according to the physical resource configuration of DMRS; and/or, determining by the terminal device, when the terminal device determines the second DMRS configuration information indicates the physical resource configuration of DMRS, a transmission power of the DMRS according to the physical resource configuration of DMRS.

In combination with the first aspect, as another implementation manner of the first aspect, the sequence configuration of DMRS includes at least one of a sequence cyclic shift used by the DMRS, an OCC used by the DMRS, a root sequence identification (ID) used by the DMRS, and a scrambling sequence ID used by the DMRS.

In combination with the first aspect, as another implementation manner of the first aspect, the determining, by the terminal device, a transmission parameter of DMRS according to the configuration parameter indicated by the second DMRS configuration information includes:

generating by the terminal device, when the terminal device determines the second DMRS configuration information indicates the sequence configuration of DMRS, the DMRS sequence according to the sequence configuration of DMRS.

In combination with the first aspect, as another implementation manner of the first aspect, same number of bits are included in the second DMRS configuration information corresponding to different types of DMRS sequence.

In combination with the first aspect, as another implementation manner of the first aspect, different configuration parameters are indicated by the second DMRS configuration information corresponding to different types of DMRS sequence.

In combination with the first aspect, as another implementation manner of the first aspect, the determining, by the terminal device, a configuration parameter indicated by the second DMRS configuration information according to the first DMRS configuration information includes:

determining by the terminal device, when the terminal device determines the first DMRS configuration information is indicative of the DMRS sequence being a PN sequence, the second DMRS configuration information indicates the antenna port configuration of DMRS and the sequence configuration of DMRS; and/or, determining by the terminal device, when the terminal device determines the first DMRS configuration information is indicative of the DMRS sequence being a ZC sequence, the second DMRS configuration information indicates the sequence configuration of DMRS.

In combination with the first aspect, as another implementation manner of the first aspect, the determining, by the terminal device, a configuration parameter indicated by the second DMRS configuration information according to the first DMRS configuration information includes:

determining by the terminal device, when the terminal device determines the first DMRS configuration information is indicative of the DMRS sequence being a PN sequence, the second DMRS configuration information indicates the physical resource configuration of DMRS; and/or, determining by the terminal device, when the terminal device determines the first DMRS configuration information is indicative of the DMRS sequence being a ZC sequence, the second DMRS configuration information indicates the sequence configuration of DMRS.

In combination with the first aspect, as another implementation manner of the first aspect, the receiving, by a terminal device, first DMRS configuration information sent by a network device includes:

receiving, by the terminal device, high layer signaling sent by the network device, the high layer signaling including the first DMRS configuration information; or receiving, by the terminal device, downlink control information DCI sent by the network device, the DCI including the first DMRS configuration information.

In combination with the first aspect, as another implementation manner of the first aspect, the receiving, by a terminal device, first DMRS configuration information sent by a network device, and the receiving, by the terminal device, second DMRS configuration information sent by the network device, includes:

receiving, by the terminal device, DCI sent by the network device, the DCI including the first DMRS configuration information and the second DMRS configuration information.

According to a second aspect, there is provided a method for transmitting uplink demodulation reference signal, including: generating, by a network device, first demodulation reference signal (DMRS) configuration information, the first DMRS configuration information indicating a type of a DMRS sequence; generating, by the network device, second DMRS configuration information, the second DMRS configuration information indicating at least one of an antenna port configuration of DMRS, a physical resource configuration of DMRS, and a sequence configuration of DMRS; and sending, by the network device, the first DMRS configuration information and the second DMRS configuration information to a terminal device.

According to the method for transmitting uplink demodulation reference signal provided by the application, the network device sends to the terminal device the first DMRS configuration information, which may indicate the type of DMRS sequence, and the second DMRS configuration information, which may indicate various configuration parameters, such that the terminal device is able to determine the configuration parameter for each type of DMRS sequence according to the first DMRS configuration information and the second DMRS configuration information and, thus, may simultaneously support multiple types of DMRS sequence, and support resource multiplexing between terminal devices using different uplink waveforms as well as between terminal devices using the same uplink waveform. So the resource utilization may be improved.

In combination with the second aspect, as an implementation manner of the second aspect, the first DMRS configuration information is indicative of the DMRS sequence being one of a pseudo-random (PN) sequence and a ZC sequence.

In combination with the second aspect, as another implementation manner of the second aspect, the antenna port configuration of DMRS includes an antenna port occupied by the DMRS or a number of antenna ports occupied by the DMRS.

In combination with the second aspect, as another implementation manner of the second aspect, the physical resource configuration of DMRS includes at least one of a number of orthogonal frequency division multiplexing (OFDM) symbols occupied by the DMRS, a subcarrier occupied by the DMRS, and a transmission pattern of the DMRS.

In combination with the second aspect, as another implementation manner of the second aspect, the sequence configuration of DMRS includes at least one of a sequence cyclic shift used by the DMRS, an orthogonal cover code (OCC) used by the DMRS, a root sequence identification (ID) used by the DMRS, and a scrambling sequence ID used by the DMRS.

In combination with the second aspect, as another implementation manner of the second aspect, same number of bits are included in the second DMRS configuration information corresponding to different types of DMRS sequence.

In combination with the second aspect, as another implementation manner of the second aspect, different configuration parameters are indicated by the second DMRS configuration information corresponding to different types of DMRS sequence.

In combination with the second aspect, as another implementation manner of the second aspect, when the first DMRS configuration information is indicative of the DMRS sequence being a PN sequence, the second DMRS configuration information indicates the antenna port configuration of DMRS and the sequence configuration of DMRS; or, when the first DMRS configuration information is indicative of the DMRS sequence being a ZC sequence, the second DMRS configuration information indicates the sequence configuration of DMRS.

In combination with the second aspect, as another implementation manner of the second aspect, when the first DMRS configuration information is indicative of the DMRS sequence being a PN sequence, the second DMRS configuration information indicates the physical resource configuration of DMRS; and/or, when the first DMRS configuration information is indicative of the DMRS sequence being a ZC sequence, the second DMRS configuration information indicates the sequence configuration of DMRS.

In combination with the second aspect, as another implementation manner of the second aspect, the sending, by the network device, the first DMRS configuration information to a terminal device includes:

sending, by the network device, high layer signaling to the terminal device, the high layer signaling including the first DMRS configuration information; or sending, by the network device, downlink control information (DCI) to the terminal device, the DCI including the first DMRS configuration information.

In combination with the second aspect, as another implementation manner of the second aspect, the sending, by the network device, the first DMRS configuration information and the second DMRS configuration information to a terminal device includes:

sending, by the network device, DCI to the terminal device, the DCI including the first DMRS configuration information and the second DMRS configuration information.

According to a third aspect, there is provided a terminal device configured to perform the method according to the forgoing first aspect or any possible implementation manner thereof. Specifically, the terminal device includes any functional module configured to perform the method according to the forgoing first aspect or any possible implementation manner thereof.

According to a fourth aspect, there is provided a network device configured to perform the method according to the forgoing second aspect or any possible implementation manner thereof. Specifically, the network device includes any functional module configured to perform the method according to the forgoing second aspect or any possible implementation manner thereof.

According to a fifth aspect, there is provided a terminal device including a processor, a memory and a transceiver. The processor, the memory and the transceiver are communicated with each other and transfer control and/or data signal via an internal connection channel, causing the terminal device to perform the method according to the forgoing first aspect or any possible implementation manner thereof.

According to a sixth aspect, there is provided a network device including a processor, a memory and a transceiver. The processor, the memory and the transceiver are communicated with each other and transfer control and/or data signal via an internal connection channel, causing the network device to perform the method according to the forgoing second aspect or any possible implementation manner thereof.

According to a seventh aspect, there is provided a computer readable medium, configured to store a computer program which includes instructions for performing the method according to the forgoing first aspect or any possible implementation manner thereof.

According to an eighth aspect, there is provided a computer readable medium, configured to store a computer program which includes instructions for performing the method according to the forgoing second aspect or any possible implementation manner thereof.

DETAILED DESCRIPTION

The technical solutions in the embodiments of the present application will be clearly and completely described in the following with reference to the accompanying drawings in the embodiments.

It should be understood that the technical solutions of the embodiments of the present application can be applied to various communication systems, such as Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) or Worldwide Interoperability for Microwave Access (WiMAX) communication system, 5G system, or New Wireless (NR) system.

In the embodiments of the present application, the terminal device may include, but is not limited to, a Mobile Station (MS), a mobile terminal, a mobile telephone, a User Equipment (UE), and a handset, a portable equipment, a vehicle, and the like. The terminal device may communicate with one or more core networks via a Radio Access Network (RAN). For example, the terminal device may be a mobile telephone (or known as "cellular" telephone), a computer with wireless communication capabilities, and the like. The terminal devices may also be any portable, pocket-sized, handheld, computer-integrated or in-vehicle mobile devices.

The network device involved in the embodiments of the present application is a device used in a radio access network for providing a wireless communication function for a terminal device. The network device may be a base station, which may include various forms such as macro base stations, micro base stations, relay stations, access points, and the like. In systems with different radio access technologies, names of devices with base station functionality may vary. For example, in LTE network, it may be referred to as an Evolved NodeB (eNB or eNodeB); and in 3rd Generation (3G) network, it may be referred to as a Node B or the like.

Figure 1:
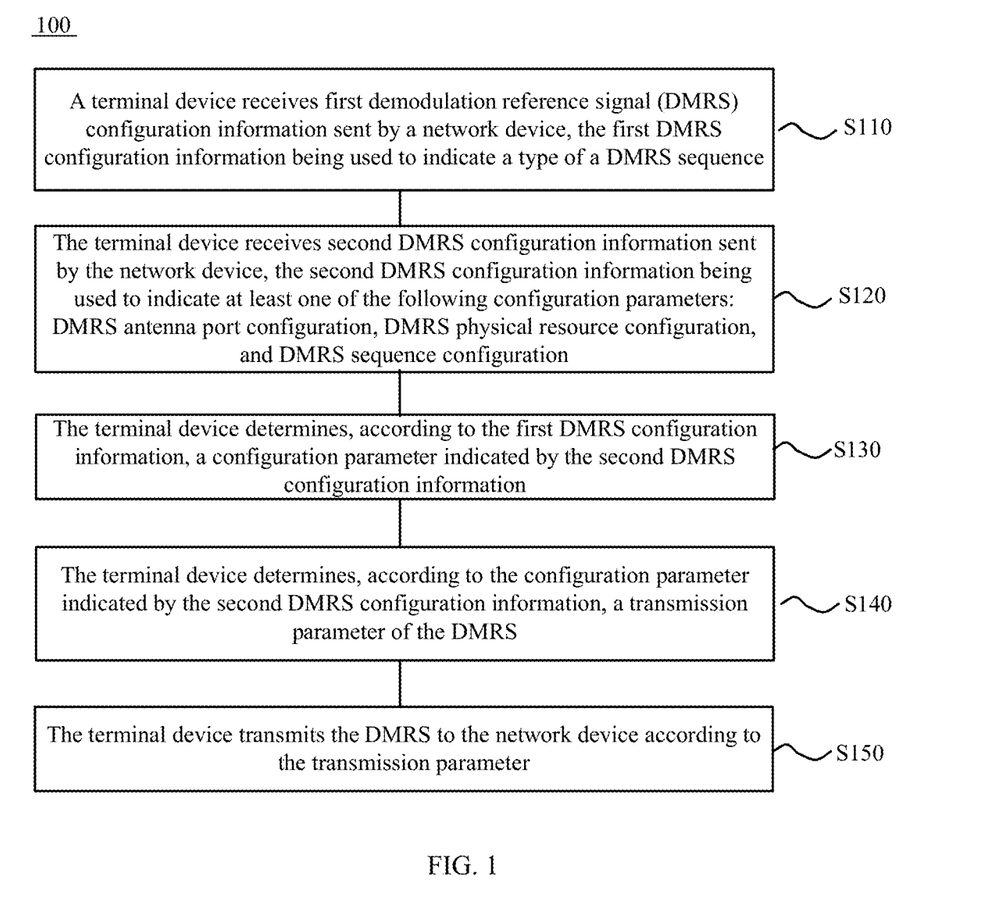
FIG. 1 is a schematic flowchart illustrating a method for transmitting uplink demodulation reference signal according to an embodiment of the present application.

FIG. 1 is a schematic flowchart illustrating a method for transmitting uplink demodulation reference signal according to an embodiment of the present application. As shown in FIG. 1, the method 100 includes following steps.

In S110, a terminal device receives first demodulation reference signal (DMRS) configuration information sent by a network device, the first DMRS configuration information indicating a type of a DMRS sequence.

In S120, the terminal device receives second DMRS configuration information sent by the network device, the second DMRS configuration information indicating at least one of an antenna port configuration of DMRS, a physical resource configuration of DMRS, and a sequence configuration of DMRS.

In S130, the terminal device determines, according to the first DMRS configuration information, a configuration parameter indicated by the second DMRS configuration information.

In S140, the terminal device determines, according to the configuration parameter indicated by the second DMRS configuration information, a transmission parameter of DMRS.

In S150, the terminal device transmits DMRS to the network device according to the transmission parameter.

According to the method for transmitting uplink demodulation reference signal provided by the application, the terminal device determines a type of DMRS sequence according to the first DMRS configuration information, which indicates the type of DMRS sequence, determines a configuration parameter indicated by the second DMRS configuration information according to the type of DMRS sequence, determines a transmission parameter of DMRS according to the determined configuration parameter and, then, performs transmission of the DMRS according to the transmission parameter of DMRS. In this way, the terminal device is able to determine the transmission parameter for each type of DMRS sequence according to the first DMRS configuration information and the second DMRS configuration information and, thus, may simultaneously support multiple types of DMRS sequence, and support resource multiplexing between terminal devices using different uplink waveforms as well as between terminal devices using the same uplink waveform. So the resource utilization may be improved.

It should be noted that the steps S110 and S120 may be two different receiving processes, and may also be the same receiving process. When the steps S110 and S120 are the same process, it may be understood as that the first DMRS configuration information and the second DMRS configuration information are carried in the same information, for example, in the same Downlink Control Information (DCI).

Optionally, in S110, the first DMRS configuration information indicates that the DMRS sequence is one of a target sequence, and the target sequence includes at least a pseudo random (PN) sequence and a Zadoff-Chu (ZC) sequence.

Optionally, in S120, the antenna port configuration of DMRS includes an antenna port occupied by the DMRS or the number of antenna port occupied by the DMRS. Additionally or alternatively, the physical resource configuration of DMRS includes at least one of the following configurations: the number of orthogonal frequency division multiplexing (OFDM) symbols occupied by the DMRS, a subcarrier (e.g., odd or even subcarrier) occupied by the DMRS, or a transmission pattern of the DMRS. Several transmission patterns may be pre-determined by the terminal device and the network device, and then the terminal device may determine the transmission pattern of the DMRS to be used according to the second DMRS configuration information. Additionally or alternatively, the sequence configuration of DMRS includes at least one of the following configurations: a sequence cyclic shift used by the DMRS, an Orthogonal Cover Code (OCC) used by the DMRS, a root sequence identification (ID) used by the DMRS, or a scrambling sequence ID used by the DMRS.

Optionally, in S140, when the terminal device determines that the second DMRS configuration information indicates the antenna port configuration of DMRS, the terminal device may determine an antenna port occupied by the DMRS according to the antenna port configuration of DMRS.

Optionally, in S140, when the terminal device determines that the second DMRS configuration information indicates the antenna port configuration of DMRS, the terminal device may determine physical resource occupied by the DMRS according to the antenna port configuration of DMRS. For example, the antenna port configuration of DMRS is indicative of the number of antenna ports. If the second DMRS configuration information indicates that the number of antenna ports occupied by the DMRS is less than or equal to 2, the terminal device determines that an odd subcarrier of each physical resource block (PRB) in the transmission bandwidth is occupied by the DMRS. if the second DMRS configuration information indicates that the number of antenna ports occupied by the DMRS is greater than 2, the terminal device determines that the DMRS occupies all subcarriers in the transmission bandwidth. In an exemplary implementation, a correspondence between the number of the antenna ports occupied by the DMRS and the occupied physical resource may be pre-determined by the network device and the terminal device. The network device may also configure the correspondence between the number of the antenna ports occupied by the DMRS and the occupied physical resource through signaling.

Optionally, in S140, when the terminal device determines that the second DMRS configuration information indicates the antenna port configuration of DMRS, the terminal device may determine a transmission power of the DMRS according to the antenna port configuration of DMRS. For example, the antenna port configuration of DMRS is indicative of an antenna port occupied by the DMRS, a correspondence between the antenna port and the transmission power may be pre-determined by the network device and the terminal device, such that the terminal device may determine, according to the antenna port indicated by the second DMRS configuration information and the correspondence, a transmission power corresponding to the occupied antenna port. Alternatively, the antenna port configuration of DMRS is indicative of the number of antenna ports occupied by the DMRS, and a correspondence between the number of antenna ports and the transmission power may be pre-determined by the network device and the terminal device, such that the terminal device may determine, according to the number of antenna ports indicated by the second DMRS configuration information and the correspondence, a transmission power as required. It can be understood that the network device may notify, through signaling, the terminal device of the correspondence between the antenna port and the transmission power as well as the correspondence between the number of antenna ports and the transmission power.

Optionally, in S140, when the terminal device determines that the second DMRS configuration information indicates the antenna port configuration of DMRS, the terminal device may determine a sequence cyclic shift and/or an OCC used by the DMRS according to the antenna port configuration of DMRS, and then generate the DMRS sequence according to the sequence cyclic shift and/or OCC used by the DMRS. For example, the antenna port configuration of DMRS is indicative of an antenna port occupied by the DMRS, with different antenna ports corresponding to different sequence cyclic shifts and/or OCCs. For example, supposing there are 4 antenna ports, numbered 0, 1, 2, and 3. If the second DMRS configuration information indicates that the antenna port numbered 0 is occupied by the DMRS, the terminal device may determine the sequence cyclic shift used by the DMRS is 3. If the second DMRS configuration information indicates that the antenna port numbered 1 is occupied by the DMRS, the terminal device may determine that the sequence cyclic shift used by the DMRS is 1. In an exemplary implementation, a correspondence between the antenna port occupied by the DMRS and the sequence cyclic shift used by the DMRS may be pre-determined by the network device and the terminal device. The network device may also configure, through signaling, the correspondence between the antenna port occupied by the DMRS and the sequence cyclic shift used by the DMRS for the terminal device.

Optionally, in S140, when the terminal device determines that the second DMRS configuration information indicates the sequence configuration of DMRS, the terminal device may generate the DMRS sequence according to the sequence configuration of DMRS. For example, when the second DMRS configuration information indicates at least one of a sequence cyclic shift used by the DMRS, an OCC used by the DMRS, or a root sequence ID used by the DMRS, the terminal device may generate the DMRS sequence according to the sequence cyclic shift, OCC, or root sequence ID indicated by the second DMRS configuration information.

Optionally, in S140, when the terminal device determines that the second DMRS configuration information indicates the physical resource configuration of DMRS, the terminal device may determine, according to the physical resource configuration of DMRS, physical resource occupied by the DMRS.

Optionally, in S140, when the terminal device determines that the second DMRS configuration information indicates the physical resource configuration of DMRS, the terminal device may determine the sequence of the DMRS according to the physical resource configuration of DMRS. For example, the physical resource configuration of DMRS is indicative of an OFDM symbol occupied by the DMRS, or the physical resource configuration of DMRS is indicative of a subcarrier occupied by the DMRS. For example, different DMRS sequences are used for different OFDM symbols, and a correspondence between the OFDM symbols and the DMRS sequences may be pre-determined by the network device and the terminal device, such that the terminal device may determine the DMRS sequence according to the OFDM symbol indicated by the second DMRS configuration information and the correspondence.

Optionally, in S140, when the terminal device determines that the second DMRS configuration information indicates the physical resource configuration of DMRS, the terminal device may determine, according to the physical resource configuration of DMRS, a transmission power of the DMRS. For example, the physical resource configuration of DMRS is indicative of a subcarrier occupied by the DMRS. Different numbers of subcarriers occupied by the DMRS may correspond to different transmission powers of the DMRS. A correspondence between the numbers of subcarriers and the transmission powers may be pre-determined by the network device and the terminal device; or, the network device may notify, through signaling, the terminal device of the correspondence between the number of subcarriers and the transmission powers.

Optionally, in S150, the transmission parameter of DMRS includes at least one of the following parameters: an antenna port occupied by the DMRS, physical resource occupied by the DMRS, or a DMRS sequence. The terminal device may transmit the DMRS signal and uplink data to the network device by using the antenna port and the DMRS sequence of corresponding antenna port as determined on the physical resource occupied by the DMRS.

In the embodiment of the present application, optionally, the same number of bits are included in the second DMRS configuration information corresponding to different types of DMRS sequence. For example, when the first DMRS configuration information indicates that the DMRS sequence is a PN sequence, the second DMRS configuration information may include M bits, where M is a positive integer greater than or equal to 1; and when the first DMRS configuration information indicates that the DMRS sequence is a ZC sequence, the second DMRS configuration information may still include M bits.

Furthermore, different configuration parameters are indicated by the second DMRS configuration information corresponding to different types of DMRS sequence. In other words, for different types of DMRS sequences, the second DMRS configuration information may include M bits, but different specific content may be indicated by the M bits.

Optionally, in some embodiments, if the first DMRS configuration information indicates that the DMRS sequence is a PN sequence, the second DMRS configuration information may indicate the antenna port configuration of DMRS and the sequence configuration of DMRS. For example, as shown in Table 1 (assuming M has a value of 4), the second DMRS configuration information indicates the antenna port and scrambling sequence used by the DMRS. Additionally or alternatively, if the first DMRS configuration information indicates that the DMRS sequence is a ZC sequence, the second DMRS configuration information may indicates the sequence configuration of DMRS. For example, as shown in Table 2 (assuming M has a value of 4), the second DMRS configuration information indicates a sequence cyclic shift and/or an OCC used by the DMRS.

It can be understood that the correspondence between the second DMRS configuration information, the antenna port, and the scrambling sequence shown in Table 1 may be pre-determined by the network device and the terminal device. The network device may also configure Table 1 to the terminal device through signaling. The terminal device may then determine the antenna port occupied by the DMRS and the scrambling sequence used by the DMRS according to the value of the second DMRS configuration information. Similarly, the correspondence between the second DMRS configuration information, the antenna port, and the sequence cyclic shift shown in Table 2 may be pre-determined by the network device and the terminal device. The network device may also configure Table 2 to the terminal device through signaling, and then the terminal device may determine the sequence cyclic shift used by the DMRS according to the value of the second DMRS configuration information.

TABLE 1

| Second DMRS Configuration Information | Antenna Port and Scrambling Sequence (Transmission Layer of 1) | Antenna Port and Scrambling Sequence (Transmission Layer of 2) | Antenna Port and Scrambling Sequence (Transmission Layer of 3) | Antenna Port and Scrambling Sequence (Transmission Layer of 4) |
|---|---|---|---|---|
| 0 | Port 0, Scrambling Sequence ID = 0 | Port {0, 1}, Scrambling Sequence ID = 0 | Port {0, 1, 2}, Scrambling Sequence ID = 0 | Port {0, 1, 2, 3}, Scrambling Sequence ID = 0 |
| 1 | Port 0, Scrambling Sequence ID = 1 | Port {0, 1}, Scrambling Sequence ID = 1 | Port {0, 1, 2}, Scrambling Sequence ID = 1 | Port {0, 1, 2, 3}, Scrambling Sequence ID = 1 |
| 2 | Port 1, Scrambling Sequence ID = 0 | Port {0, 1}, Scrambling Sequence ID = 2 | Port {0, 1, 2}, Scrambling Sequence ID = 2 | — |
| 3 | Port 1, Scrambling Sequence ID = 1 | Port {0, 1}, Scrambling Sequence ID = 3 | Port {0, 1, 2}, Scrambling Sequence ID = 3 | — |
| 4 | Port 2, Scrambling Sequence ID = 0 | Port {2, 3}, Scrambling Sequence ID = 0 | — | — |
| 5 | Port 2, Scrambling Sequence ID = 1 | Port {2, 3}, Scrambling Sequence ID = 1 | — | — |
| 6 | Port 3, Scrambling Sequence ID = 0 | Port {2, 3}, Scrambling Sequence ID = 2 | — | — |
| 7 | Port 3, Scrambling Sequence ID = 1 | Port {2, 3}, Scrambling Sequence ID = 3 | — | — |

TABLE 2

| Second DMRS Configuration Information | Sequence Cyclic Shift | | | |
|---|---|---|---|---|
| | Port 0 | Port 1 | Port 2 | Port 3 |
| 0 | 0 | 6 | 3 | 9 |
| 1 | 2 | 8 | 5 | 11 |
| 2 | 3 | 9 | 0 | 6 |
| 3 | 5 | 11 | 2 | 8 |
| 4 | 6 | 0 | 9 | 3 |
| 5 | 8 | 2 | 11 | 5 |
| 6 | 9 | 3 | 6 | 0 |
| 7 | 11 | 5 | 8 | 2 |

Optionally, in other embodiments, if the first DMRS configuration information indicates that the DMRS sequence is a PN sequence, the second DMRS configuration information may indicate the physical resource configuration of DMRS. For example, the second DMRS configuration information may indicate whether the subcarrier occupied by the DMRS is an odd subcarrier or an even subcarrier, or the second DMRS configuration information may indicate the number of OFDM symbols occupied by the DMRS. Alternatively, if the first DMRS configuration information indicates that the DMRS sequence is a PN sequence, the second DMRS configuration information may indicate an antenna port occupied by the DMRS, and the terminal device may determine the physical resource occupied by the DMRS according to the antenna port occupied by the DMRS.

Optionally, in another embodiment, if the first DMRS configuration information indicates that the DMRS sequence is a ZC sequence, the second DMRS configuration information may indicate the sequence configuration of DMRS. For example, the second DMRS configuration information may indicate the sequence cyclic shift and/or root sequence ID used by the DMRS. In an exemplary implementation, the network device may configure a plurality of root sequence IDs for the terminal device in advance, and the terminal device may select a root sequence ID to be used from the plurality of root sequence IDs according to indication of the second DMRS configuration information.

In all the above embodiments, the network device may send the first DMRS configuration information to the terminal device by using high layer signaling, and the network device may also send the first DMRS configuration information to the terminal device by using DCI.

In all the above embodiments, optionally, the network device may send, to the terminal device, DCI for scheduling uplink data transmission, the DCI including N-bit DMRS configuration information, where N is a positive integer greater than or equal to 2. 1 bit of the N bits may be used to carry the first DMRS configuration information, and the remaining N−1 bits of the N bits may be used to carry the second DMRS configuration information. In other words, the first DMRS configuration information and the second DMRS configuration information may be carried in one piece of DCI. The terminal device may determine the type of the DMRS sequence according to the 1 bit in the DCI. For example, the value of the 1 bit takes 0 to represent the PN sequence, and 1 to represent the ZC sequence. Then, the terminal device may determine the information indicated by the N−1 bits in the DCI according to the type of the DMRS sequence, and determine the physical resource and the antenna port occupied by the DMRS as well as the DMRS sequence.

For example, if the DMRS sequence is a PN sequence, the terminal device may determine, according to the information indicated by the N−1 bits and the Table 1, the antenna port occupied by the DMRS and the scrambling sequence used by the DMRS, then determine the physical resource occupied by the DMRS according to the occupied antenna port, and generate a DMRS sequence according to the scrambling sequence. Alternatively, if the DMRS sequence is a ZC sequence, the terminal device may determine, according to the information indicated by the N−1 bits and the Table 2, the sequence cyclic shift used by each port occupied by the DMRS, then generate a DMRS sequence according to the determined sequence cyclic shift, and determine that the DMRS occupies all subcarriers in the transmission bandwidth (regardless of the number of occupied antenna ports).

The method for transmitting uplink demodulation reference signal according to an embodiment of the present application is described in detail above from the terminal device side with reference to FIG. 1. The method for transmitting uplink demodulation reference signal according to an embodiment of the present application will be further described in detail below from the network device side with reference to FIG. 2. It should be understood that the interaction between the network device and the terminal device described from the network device side may be the same as that described from the terminal device side and, thus, related description may be omitted as appropriate to avoid repetition.

Figure 2:
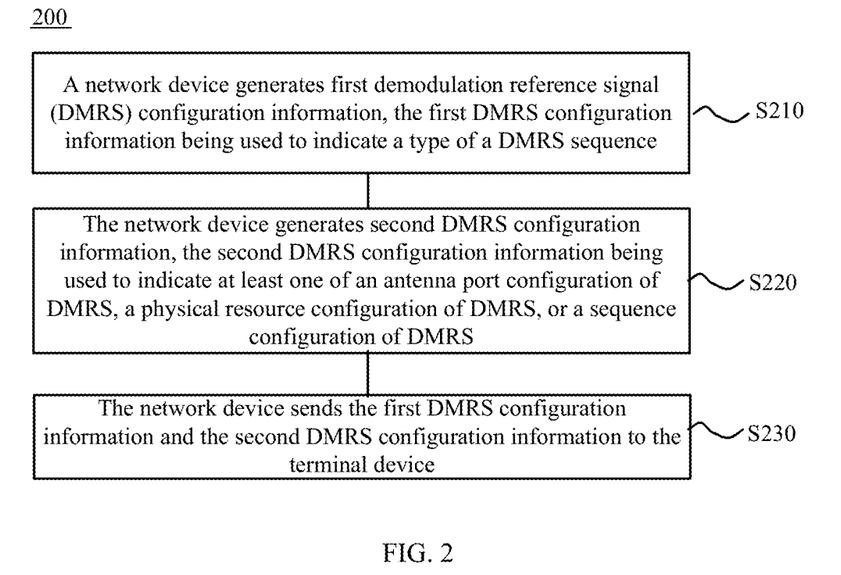
FIG. 2 is a schematic flowchart illustrating a method for transmitting uplink demodulation reference signal according to another embodiment of the present application.

FIG. 2 is a schematic flowchart illustrating a method for transmitting uplink demodulation reference signal according to another embodiment of the present application. As shown in FIG. 2, the method 200 includes following steps.

In S210, a network device generates first demodulation reference signal (DMRS) configuration information, the first DMRS configuration information indicating a type of a DMRS sequence.

In S220, the network device generates second DMRS configuration information, the second DMRS configuration information indicating at least one of following configuration parameters: an antenna port configuration of DMRS, a physical resource configuration of DMRS, or a sequence configuration of DMRS.

In S230, the network device sends the first DMRS configuration information and the second DMRS configuration information to the terminal device.

According to the method for transmitting uplink demodulation reference signal provided by the application, the network device sends to the terminal device the first DMRS configuration information, which may indicate the type of DMRS sequence, and the second DMRS configuration information, which may indicate various configuration parameters, such that the terminal device is able to determine the configuration parameter for each type of DMRS sequence according to the first DMRS configuration information and the second DMRS configuration information and, thus, may simultaneously support multiple types of DMRS sequence, and support resource multiplexing between terminal devices using different uplink waveforms as well as between terminal devices using the same uplink waveform. So the resource utilization may be improved.

In an embodiment of the present application, optionally, the first DMRS configuration information is indicative of the DMRS sequence being one of a pseudo-random (PN) sequence and a ZC sequence.

In an embodiment of the present application, optionally, the antenna port configuration of DMRS includes an antenna port occupied by the DMRS or the number of antenna ports occupied by the DMRS.

In an embodiment of the present application, optionally, the physical resource configuration of DMRS includes at least one of following configuration: the number of orthogonal frequency division multiplexing (OFDM) symbols occupied by the DMRS, a subcarrier occupied by the DMRS, or a transmission pattern of the DMRS.

In an embodiment of the present application, optionally, the sequence configuration of DMRS includes at least one of following configuration: a sequence cyclic shift used by the DMRS, an orthogonal cover code (OCC) used by the DMRS, a root sequence identification (ID) used by the DMRS, or a scrambling sequence ID used by the DMRS.

In an embodiment of the present application, optionally, the same number of bits are included in the second DMRS configuration information corresponding to different types of DMRS sequence.

In an embodiment of the present application, optionally, different configuration parameters are indicated by the second DMRS configuration information corresponding to different types of DMRS sequence.

In an embodiment of the present application, optionally, when the first DMRS configuration information is indicative of the DMRS sequence being a PN sequence, the second DMRS configuration information indicates the antenna port configuration of DMRS and the sequence configuration of DMRS; or, when the first DMRS configuration information is indicative of the DMRS sequence being a ZC sequence, the second DMRS configuration information indicates the sequence configuration of DMRS.

In the embodiment of the present application, optionally, when the first DMRS configuration information is indicative of the DMRS sequence being a PN sequence, the second DMRS configuration information indicates the physical resource configuration of DMRS; and/or, when the first DMRS configuration information is indicative of the DMRS sequence being a ZC sequence, the second DMRS configuration information indicates the sequence configuration of DMRS.

In an embodiment of the present application, optionally, S230 may include:

sending, by the network device, high layer signaling to the terminal device, the high layer signaling including the first DMRS configuration information; or sending, by the network device, downlink control information (DCI) to the terminal device, the DCI including the first DMRS configuration information.

In the embodiment of the present application, optionally, S230 may specifically include: sending, by the network device, DCI to the terminal device, the DCI including the first DMRS configuration information and the second DMRS configuration information.

The method for transmitting uplink demodulation reference signal according to embodiments of the present application is described in detail with reference to FIG. 1 and FIG. 2. A terminal device according to an embodiment of the present application will be described in detail below with reference to FIG. 3. The terminal device 10 may include a transceiving module 11 and a processing module 12.

Figure 3:
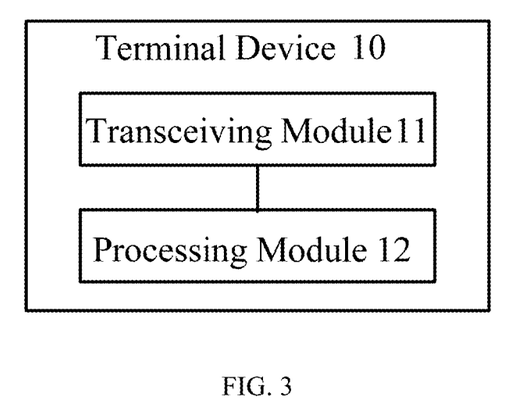
FIG. 3 is a schematic block diagram illustrating a terminal device according to an embodiment of the present application.

The transceiving module 11 is configured to receive first demodulation reference signal (DMRS) configuration information sent by a network device, the first DMRS configuration information indicating a type of a DMRS sequence.

The transceiving module 11 is further configured to receive second DMRS configuration information sent by the network device, the second DMRS configuration information indicating at least one of following configuration parameters: an antenna port configuration of DMRS, a physical resource configuration of DMRS, or a sequence configuration of DMRS.

The processing module 12 is configured to determine a configuration parameter indicated by the second DMRS configuration information according to the first DMRS configuration information.

The processing module 12 is further configured to determine a transmission parameter of DMRS according to the configuration parameter indicated by the second DMRS configuration information.

The transceiving module 11 is further configured to transmit DMRS to the network device according to the transmission parameter.

The terminal device according to the present application determines a type of DMRS sequence according to the first DMRS configuration information, which indicates the type of DMRS sequence, determines a configuration parameter indicated by the second DMRS configuration information according to the type of DMRS sequence, determines a transmission parameter of DMRS according to the determined configuration parameter and, then, performs transmission of the DMRS according to the transmission parameter of DMRS. In this way, the terminal device is able to determine the transmission parameters for each type of DMRS sequence according to the first DMRS configuration information and the second DMRS configuration information and, thus, may simultaneously support multiple DRMS sequence types.

In an embodiment of the present application, optionally, the transmission parameter of DMRS includes at least one of following parameters: an antenna port occupied by the DMRS, physical resource occupied by the DMRS, a DMRS sequence, or a transmission power of the DMRS.

In an embodiment of the present application, optionally, the first DMRS configuration information is indicative of the DMRS sequence being one of a pseudo-random (PN) sequence and a ZC sequence.

In an embodiment of the present application, optionally, the antenna port configuration of DMRS includes an antenna port occupied by the DMRS or the number of antenna ports occupied by the DMRS.

In an embodiment of the present application, optionally, the processing module 12 is specifically configured to:

determine, when the second DMRS configuration information is determined as indicating the antenna port configuration of DMRS, an antenna port occupied by the DMRS according to the antenna port configuration of DMRS; and/or, determine, when the second DMRS configuration information is determined as indicating the antenna port configuration of DMRS, physical resource occupied by the DMRS according the antenna port configuration of DMRS; and/or, determine, when the second DMRS configuration information is determined as indicating the antenna port configuration of DMRS, a transmission power of the DMRS according to the antenna port configuration of DMRS; and/or, determine, when the second DMRS configuration information is determined as indicating the antenna port configuration of DMRS, a sequence cyclic shift and/or an orthogonal cover code (OCC) used by the DMRS according to the antenna port configuration of DMRS, and generate the DMRS sequence according to the sequence cyclic shift and/or the OCC used by the DMRS.

In an embodiment of the present application, optionally, the physical resource configuration of DMRS includes at least one of following configuration: the number of orthogonal frequency division multiplexing (OFDM) symbols occupied by the DMRS, a subcarrier occupied by the DMRS, or a transmission pattern of the DMRS.

In an embodiment of the present application, optionally, the processing module 12 is specifically configured to:

determine, when the second DMRS configuration information is determined as indicating the physical resource configuration of DMRS, physical resource occupied by the DMRS according to the physical resource configuration of DMRS; and/or determine, when the second DMRS configuration information is determined as indicating the physical resource configuration of DMRS, the DMRS sequence according to the physical resource configuration of DMRS; and/or, determine, when the second DMRS configuration information is determined as indicating the physical resource configuration of DMRS, a transmission power of the DMRS according to the physical resource configuration of DMRS.

In an embodiment of the present application, optionally, the sequence configuration of DMRS includes at least one of following configuration: a sequence cyclic shift used by the DMRS, an OCC used by the DMRS, a root sequence identification (ID) used by the DMRS, or a scrambling sequence ID used by the DMRS.

In an embodiment of the present application, the processing module 12 is specifically configured to: generate, when the second DMRS configuration information is determined as indicating the sequence configuration of DMRS, the DMRS sequence according to the sequence configuration of DMRS.

In an embodiment of the present application, optionally, the same number of bits are included in the second DMRS configuration information corresponding to different types of DMRS sequence.

In an embodiment of the present application, optionally, different configuration parameters are indicated by the second DMRS configuration information corresponding to different types of DMRS sequence.

In an embodiment of the present application, optionally, the processing module 12 is specifically configured to:

determine, when the first DMRS configuration information is determined as indicating the DMRS sequence being a PN sequence, the second DMRS configuration information indicates the antenna port configuration of DMRS and the sequence configuration of DMRS; and/or, determine, when the first DMRS configuration information is determined as indicating the DMRS sequence being a ZC sequence, the second DMRS configuration information indicates the sequence configuration of DMRS.

In an embodiment of the present application, optionally, the processing module 12 is specifically configured to:

determine, when the first DMRS configuration information is determined as indicating the DMRS sequence being a PN sequence, the second DMRS configuration information indicates the physical resource configuration of DMRS; and/or, determine, when the first DMRS configuration information is determined as indicating the DMRS sequence being a ZC sequence, the second DMRS configuration information indicates the sequence configuration of DMRS.

In an embodiment of the present application, optionally, the transceiving module 11 is specifically configured to:

receive high layer signaling sent by the network device, the high layer signaling including the first DMRS configuration information; or receive downlink control information (DCI) sent by the network device, the DCI including the first DMRS configuration information.

In an embodiment of the present application, optionally, the transceiving module 11 is specifically configured to:

receive DCI sent by the network device, the DCI including the first DMRS configuration information and the second DMRS configuration information.

The terminal device according to embodiments of the present application may refer to the corresponding processes of the method 100 according to the embodiments of the present application. Moreover, the respective units/modules in the terminal device and the other operations and/or functions described above are respectively for the purpose of implementing the corresponding processes in the method 100 and, thus, will not be repeated here for the sake of brevity.

Figure 4:
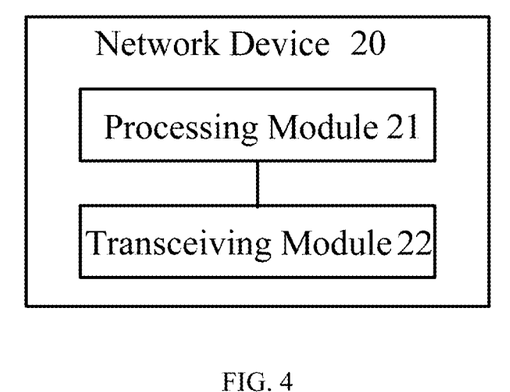
FIG. 4 is a schematic block diagram illustrating a network device according to an embodiment of the present application.

FIG. 4 illustrates a network device according to an embodiment of the present application. As shown in FIG. 4, the network device 20 includes a processing module 21 and a transceiving module 22.

The processing module 21 is configured to generate first demodulation reference signal (DMRS) configuration information, the first DMRS configuration information indicating a type of a DMRS sequence.

The processing module 21 is further configured to generate second DMRS configuration information, the second DMRS configuration information indicating at least one of an antenna port configuration of DMRS, a physical resource configuration of DMRS, and a sequence configuration of DMRS.

The transceiving module 22 is configured to send the first DMRS configuration information and the second DMRS configuration information to the terminal device.

The network device according to the present application transmits, to the terminal device, the first DMRS configuration information indicating a type of the DMRS sequence and the second DMRS configuration information indicating a plurality of configuration parameters, so that the terminal device is able to determine transmission parameters for each type of DMRS sequence according to the first DMRS configuration information and the second DMRS configuration information and, thus, may support multiple DMRS sequence types.

In an embodiment of the present application, optionally, the first DMRS configuration information is indicative of the DMRS sequence being one of a pseudo-random (PN) sequence and a ZC sequence.

In an embodiment of the present application, optionally, the antenna port configuration of DMRS includes an antenna port occupied by the DMRS or the number of antenna ports occupied by the DMRS.

In an embodiment of the present application, optionally, the physical resource configuration of DMRS includes at least one of following configuration: the number of orthogonal frequency division multiplexing (OFDM) symbols occupied by the DMRS, a subcarrier occupied by the DMRS, or a transmission pattern of the DMRS.

In an embodiment of the present application, optionally, the sequence configuration of DMRS includes at least one of following configuration: a sequence cyclic shift used by the DMRS, an orthogonal cover code (OCC) used by the DMRS, a root sequence identification (ID) used by the DMRS, or a scrambling sequence ID used by the DMRS.

In an embodiment of the present application, optionally, the same number of bits are included in the second DMRS configuration information corresponding to different types of DMRS sequence.

In an embodiment of the present application, optionally, different configuration parameters are indicated by the second DMRS configuration information corresponding to different types of DMRS sequence.

In an embodiment of the present application, optionally, when the first DMRS configuration information is indicative of the DMRS sequence being a PN sequence, the second DMRS configuration information indicates the antenna port configuration of DMRS and the sequence configuration of DMRS; or, when the first DMRS configuration information is indicative of the DMRS sequence being a ZC sequence, the second DMRS configuration information indicates the sequence configuration of DMRS.

In an embodiment of the present application, optionally, when the first DMRS configuration information is indicative of the DMRS sequence being a PN sequence, the second DMRS configuration information indicates the physical resource configuration of DMRS; and/or, when the first DMRS configuration information is indicative of the DMRS sequence being a ZC sequence, the second DMRS configuration information indicates the sequence configuration of DMRS.

In an embodiment of the present application, optionally, the transceiving module 22 is specifically configured to:

send high layer signaling to the terminal device, the high layer signaling including the first DMRS configuration information; or send downlink control information (DCI) to the terminal device, the DCI including the first DMRS configuration information.

In an embodiment of the present application, the transceiving module 22 is specifically configured to: send DCI to the terminal device, the DCI including the first DMRS configuration information and the second DMRS configuration information.

The network device according to embodiments of the present application may refer to the corresponding processes of the method 200 according to the embodiments of the present application. Moreover, the respective units/modules in the network device and the other operations and/or functions described above are respectively for the purpose of implementing the corresponding processes in the method 200 and, thus, will not be repeated here for the sake of brevity.

Figure 5:
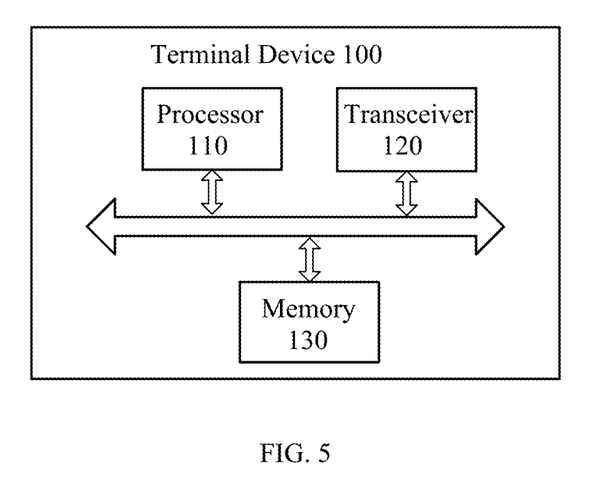
FIG. 5 is a schematic block diagram illustrating a terminal device according to another embodiment of the present application.

FIG. 5 illustrates a terminal device according to another embodiment of the present application. As shown in FIG. 5, the terminal device 100 includes a processor 110 and a transceiver 120. The processor 110 is connected with the transceiver 120. Optionally, the terminal device 100 further includes a memory 130. The memory 130 is connected with the processor 110. The processor 110, the memory 130, and the transceiver 120 may communicate with each other through an internal connection channel. The transceiver 120 is configured to receive first demodulation reference signal (DMRS) configuration information sent by a network device, the first DMRS configuration information indicating a type of a DMRS sequence, and the transceiver 120 is further configured to receive second DMRS configuration information sent by the network device, the second DMRS configuration information indicating at least one of following configuration parameters: an antenna port configuration of DMRS, a physical resource configuration of DMRS, or a sequence configuration of DMRS. The processor 110 is configured to determine a configuration parameter indicated by the second DMRS configuration information according to the first DMRS configuration information, the processor 110 is further configured to determine a transmission parameter of DMRS according to the configuration parameter indicated by the second DMRS configuration information; and the transceiver 120 is further configured to transmit DMRS to the network device according to the transmission parameter.

Therefore, the terminal device according to the present application determines a type of DMRS sequence according to the first DMRS configuration information, which indicates the type of DMRS sequence, determines a configuration parameter indicated by the second DMRS configuration information according to the type of DMRS sequence, determines a transmission parameter of DMRS according to the determined configuration parameter and, then, performs transmission of the DMRS according to the transmission parameter of DMRS. In this way, the terminal device is able to determine the transmission parameters for each type of DMRS sequence according to the first DMRS configuration information and the second DMRS configuration information and, thus, may simultaneously support multiple DRMS sequence types.

The terminal device 100 according to embodiments of the present application may refer to the corresponding terminal device 10 according to the embodiments of the present application. Moreover, the respective units/modules in the terminal device and the other operations and/or functions described above are respectively for the purpose of implementing the corresponding processes in the method 100 and, thus, will not be repeated here for the sake of brevity.

Figure 6:
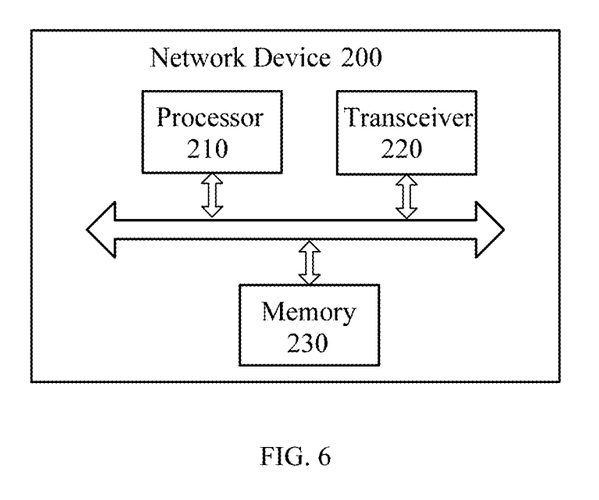
FIG. 6 is a schematic block diagram illustrating a network device according to another embodiment of the present application.

FIG. 6 is a schematic block diagram illustrating a network device according to another embodiment of the present application. As shown in FIG. 6, the network device 200 includes a processor 210 and a transceiver 220. The processor 210 is connected with the transceiver 220. Optionally, the network device 200 further includes a memory 230. The memory 230 is connected with the processor 210. The processor 210, the memory 230, and the transceiver 220 may communicate with each other through an internal connection channel. The processor 210 is configured to generate first demodulation reference signal (DMRS) configuration information, the first DMRS configuration information indicating a type of a DMRS sequence, and the processor 210 is further configured to generate second DMRS configuration information, the second DMRS configuration information indicating at least one of following configuration parameters: an antenna port configuration of DMRS, a physical resource configuration of DMRS, or a sequence configuration of DMRS; and the transceiver 210 is configured to send the first DMRS configuration information and the second DMRS configuration information to a terminal device.

Therefore, the network device according to the present application transmits, to the terminal device, the first DMRS configuration information indicating a type of the DMRS sequence and the second DMRS configuration information indicating a plurality of configuration parameters, so that the terminal device is able to determine transmission parameters for each type of DMRS sequence according to the first DMRS configuration information and the second DMRS configuration information and, thus, may support multiple DMRS sequence types.

The network device 200 according to embodiments of the present application may refer to the corresponding network device 20 according to the embodiments of the present application. Moreover, the respective units/modules in the network device and the other operations and/or functions described above are respectively for the purpose of implementing the corresponding processes in the method 200 and, thus, will not be repeated here for the sake of brevity.

It can be understood that the processor in the embodiments of the present application may be an integrated circuit chip with signal processing capability. The processor may include a general-purpose processor, a digital signal processor (DSP), an application specific integrated circuit (ASIC), a field programmable gate array (FPGA), or other programming logic devices, discrete gates or transistor logic devices, discrete hardware components, which is able to implement or execute the methods, steps, and logical block diagrams disclosed in the embodiments of the present application. The general purpose processor may be a microprocessor, or the processor may be any conventional processor or the like.

The memory in the embodiments of the present application may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric erasable programmable read only memory (EEPROM) or flash memory. The volatile memory may be a random access memory (RAM) that acts as an external cache. By way of example and not limitation, many forms of RAM are available, such as static random access memory (SRAM), dynamic random access memory (DRAM), synchronous dynamic random access memory (Synchronous DRAM, SDRAM), double data rate SDRAM (DDR SDRAM), enhanced synchronous dynamic random access memory (ESDRAM), synchronous link connection dynamic random access memory (Synchlink DRAM, SLDRAM) and direct rambus random access memory (DR RAM). It should be noted that the memories in the systems and methods described herein are intended to include, without being limited to, these and any other suitable types of memory.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to go beyond the scope of the present application.

A person skilled in the art can clearly understand that, for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may be or may not be physically separated, and the components displayed as units may be or may not be physical units, that is, may be located at one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, which is essential or contributes to the prior art, or a part of the technical solution, may be embodied in the form of a software product, which is stored in a storage medium, including the instructions used to cause a computer device (which may be a personal computer, server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like, which can store program code.

The foregoing is only a specific embodiment of the present application, but the scope of protection of the present application is not limited thereto, and any person skilled in the art can easily think of changes or substitutions within the technical scope disclosed in the present application, which should be covered by the scope of protection of this application. Therefore, the scope of protection of the present application should be determined by the scope of the claims.

What is claimed is:

1. A method for transmitting uplink demodulation reference signal, being performed by a terminal device supporting multiple types of DMRS sequence, the method comprising:

receiving, by the terminal device, first demodulation reference signal (DMRS) configuration information sent by a network device, the first DMRS configuration information indicating a type of a DMRS sequence;

receiving, by the terminal device, second DMRS configuration information sent by the network device, the second DMRS configuration information indicating at least one of an antenna port configuration of DMRS, and a physical resource configuration of DMRS, wherein the physical resource configuration of DMRS comprises at least one of a number of orthogonal frequency division multiplexing (OFDM) symbols occupied by the DMRS, a subcarrier occupied by the DMRS, and a transmission pattern of the DMRS;

determining, by the terminal device, a configuration parameter indicated by the second DMRS configuration information according to the first DMRS configuration information;

determining, by the terminal device, a transmission parameter of DMRS according to the configuration parameter indicated by the second DMRS configuration information; and transmitting, by the terminal device, DMRS to the network device according to the transmission parameter;

wherein the first DMRS configuration information occupies 1 bit in a high layer signaling sent by the network device, and the second DMRS configuration information is sent separately through information different from the high layer signaling.

2. The method according to claim 1, wherein the transmission parameter of DMRS comprises at least one of an antenna port occupied by the DMRS, physical resource occupied by the DMRS, a DMRS sequence, and a transmission power of the DMRS.

3. The method according to claim 1, wherein the antenna port configuration of DMRS comprises at least one antenna port occupied by the DMRS.

4. The method according to claim 1, wherein the determining, by the terminal device, a transmission parameter of DMRS according to the configuration parameter indicated by the second DMRS configuration information comprises at least one action of:

determining by the terminal device, when the terminal device determines the second DMRS configuration information indicates the antenna port configuration of DMRS, an antenna port occupied by the DMRS according to the antenna port configuration of DMRS;

determining by the terminal device, when the terminal device determines the second DMRS configuration information indicates the antenna port configuration of DMRS, physical resource occupied by the DMRS according the antenna port configuration of DMRS;

determining by the terminal device, when the terminal device determines the second DMRS configuration information indicates the antenna port configuration of DMRS, a transmission power of the DMRS according to the antenna port configuration of DMRS; and determining by the terminal device, when the terminal device determines the second DMRS configuration information indicates the antenna port configuration of DMRS, at least one of a sequence cyclic shift and an orthogonal cover code (OCC) used by the DMRS according to the antenna port configuration of DMRS, and generating, by the terminal device, the DMRS sequence according to the at least one of the sequence cyclic shift and the OCC used by the DMRS.

5. The method according to claim 1, wherein the determining, by the terminal device, a transmission parameter of DMRS according to the configuration parameter indicated by the second DMRS configuration information comprises at least one action of:

determining by the terminal device, when the terminal device determines the second DMRS configuration information indicates the physical resource configuration of DMRS, physical resource occupied by the DMRS according to the physical resource configuration of DMRS;

determining by the terminal device, when the terminal device determines the second DMRS configuration information indicates the physical resource configuration of DMRS, the DMRS sequence according to the physical resource configuration of DMRS; and determining by the terminal device, when the terminal device determines the second DMRS configuration information indicates the physical resource configuration of DMRS, a transmission power of the DMRS according to the physical resource configuration of DMRS.

6. A method for transmitting uplink demodulation reference signal, comprising:
generating, by a network device, first demodulation reference signal (DMRS) configuration information, the first DMRS configuration information indicating a type of a DMRS sequence;
generating, by the network device, second DMRS configuration information, the second DMRS configuration information indicating at least one of an antenna port configuration of DMRS, and a physical resource configuration of DMRS, wherein the physical resource configuration of DMRS comprises at least one of a number of orthogonal frequency division multiplexing (OFDM) symbols occupied by the DMRS, a subcarrier occupied by the DMRS, and a transmission pattern of the DMRS; and
sending, by the network device, the first DMRS configuration information and the second DMRS configuration information to a terminal device supporting multiple types of DMRS sequence;
wherein the first DMRS configuration information occupies 1 bit in a high layer signaling sent to the terminal device, and the second DMRS configuration information is sent separately through information different from the high layer signaling.

7. The method according to claim 6, wherein the antenna port configuration of DMRS comprises at least one antenna port occupied by the DMRS.

8. A terminal device, supporting multiple types of DMRS sequence, the terminal device comprising:
a transceiver, configured to receive first demodulation reference signal (DMRS) configuration information sent by a network device, the first DMRS configuration information indicating a type of a DMRS sequence;
the transceiver being further configured to receive second DMRS configuration information sent by the network device, the second DMRS configuration information indicating at least one of an antenna port configuration of DMRS, and a physical resource configuration of DMRS, wherein the physical resource configuration of DMRS comprises at least one of a number of orthogonal frequency division multiplexing (OFDM) symbols occupied by the DMRS, a subcarrier occupied by the DMRS, and a transmission pattern of the DMRS;
a processor, configured to determine a configuration parameter indicated by the second DMRS configuration information according to the first DMRS configuration information;
the processor being further configured to determine a transmission parameter of DMRS according to the configuration parameter indicated by the second DMRS configuration information; and
the transceiver being further configured to transmit DMRS to the network device according to the transmission parameter;
wherein the first DMRS configuration information occupies 1 bit in a high layer signaling sent by the network device, and the second DMRS configuration information is sent separately through information different from the high layer signaling.

9. The terminal device according to claim 8, wherein the transmission parameter of DMRS comprises at least one of an antenna port occupied by the DMRS, physical resource occupied by the DMRS, a DMRS sequence, and a transmission power of the DMRS.

10. The terminal device according to claim 8, wherein the antenna port configuration of DMRS comprises an antenna port occupied by the DMRS or a number of antenna ports occupied by the DMRS.

11. The terminal device according to claim 8, wherein the processor is specifically configured to perform at least one process of:
determining, in response to determining the second DMRS configuration information as indicating the antenna port configuration of DMRS, an antenna port occupied by the DMRS according to the antenna port configuration of DMRS;
determining, in response to determining the second DMRS configuration information as indicating the antenna port configuration of DMRS, physical resource occupied by the DMRS according the antenna port configuration of DMRS;
determining, in response to determining the second DMRS configuration information as indicating the antenna port configuration of DMRS, a transmission power of the DMRS according to the antenna port configuration of DMRS; and
determining, in response to determining the second DMRS configuration information as indicating the antenna port configuration of DMRS, at least one of a sequence cyclic shift and an orthogonal cover code (OCC) used by the DMRS according to the antenna port configuration of DMRS, and generating the DMRS sequence according to the at least one of the sequence cyclic shift and the OCC used by the DMRS.

12. The terminal device according to claim 8, wherein the processor is specifically configured to perform at least one process of:
determining, in response to determining the second DMRS configuration information as indicating the physical resource configuration of DMRS, physical resource occupied by the DMRS according to the physical resource configuration of DMRS;
determining, in response to determining the second DMRS configuration information as indicating the physical resource configuration of DMRS, the DMRS sequence according to the physical resource configuration of DMRS; or,
determining, in response to determining the second DMRS configuration information as indicating the physical resource configuration of DMRS, a transmission power of the DMRS according to the physical resource configuration of DMRS.

13. A network device, comprising:
a processor, configured to generate first demodulation reference signal (DMRS) configuration information, the first DMRS configuration information indicating a type of a DMRS sequence; and generate second DMRS configuration information, the second DMRS configuration information indicating at least one of an antenna port configuration of DMRS, and a physical resource configuration of DMRS, wherein the physical resource configuration of DMRS comprises at least one of a number of orthogonal frequency division multiplexing (OFDM) symbols occupied by the DMRS, a subcarrier occupied by the DMRS, and a transmission pattern of the DMRS; and a transceiver, configured to send the first DMRS configuration information and the second DMRS configuration information to a terminal device supporting multiple types of DMRS sequence;

wherein the first DMRS configuration information occupies 1 bit in a high layer signaling sent to the terminal device, and the second DMRS configuration information is sent separately through information different from the high layer signaling.

14. The network device according to claim 13, wherein the antenna port configuration of DMRS comprises at least one antenna port occupied by the DMRS.

* * * * *